United States Patent [19]

Nishikawa et al.

[11] 4,056,579

[45] Nov. 1, 1977

[54] NOVEL THERMOSETTING RESIN COMPOSITION AND CURED PRODUCT THEREFROM

[75] Inventors: Akio Nishikawa, Hitachi; Hitoshi Yokono, Katsuta; Shun-ichi Numata; Junji Mukai, both of Hitachi, all of Japan

[73] Assignee: Hitachi, Ltd., Japan

[21] Appl. No.: 613,543

[22] Filed: Sept. 15, 1975

[30] Foreign Application Priority Data

Sept. 30, 1974 Japan .................................. 49-111543

[51] Int. Cl.$^2$ ............................................. C08L 63/00
[52] U.S. Cl. ............................... 260/830 P; 260/2 N; 260/47 EN; 260/77.5 R
[58] Field of Search .......................... 260/83 P, 77.5 R

[56] References Cited

U.S. PATENT DOCUMENTS

| | | | |
|---|---|---|---|
| 3,242,108 | 3/1966 | McGary | 260/2.5 |
| 3,300,420 | 1/1967 | Frey | 260/2.5 |
| 3,317,480 | 5/1967 | Fetscher | 260/77.5 R |
| 3,489,696 | 1/1970 | Miller | 260/2.5 |
| 3,493,540 | 2/1970 | Muller | 260/47 |
| 3,562,217 | 2/1971 | Zalewski | 260/63 |
| 3,620,987 | 11/1971 | McLaughlin | 260/2.5 N |
| 3,732,186 | 5/1973 | Dunwald | 260/77.5 AM |

*Primary Examiner*—Paul Lieberman
*Attorney, Agent, or Firm*—Craig & Antonelli

[57] ABSTRACT

A novel thermosetting resin composition consisting essentially of (a) an isocyanate group-terminated condensate obtained by reacting a polycarboxylic acid compound having at least one acid anhydride ring with a stoichiometrical excess of a polyfunctional isocyanate compound or said condensate containing the unreacted isocyanate compound, (b) a polyfunctional epoxy compound and (c) a catalyst which forms mainly isocyanurate rings and oxazolidone rings. A cured product having excellent thermal resistance and excellent high temperature strength can be obtained by heating said composition.

8 Claims, No Drawings

NOVEL THERMOSETTING RESIN COMPOSITION AND CURED PRODUCT THEREFROM

The present invention relates to a novel thermosetting resin composition and a cured product therefrom.

Materials having good mechanical and electrical properties, moldability and excellent thermal resistance have recently been required with an increase in operational temperature, an improvement in reliability of electronic parts, etc. caused by an increase in capacity, miniaturization or a decrease in weight of electrical machinery and apparatus. Excellent heat-resistant polymers of hetero ring system such as polyimide resins are known, but most of them have been restricted in scope of application since they cannot be used without the use of any solvent. Heat-resistant resin compositions consisting of a polyfunctional isocyanate and a polyfunctional epoxy compound which can be used without the use of any solvent have more recently been proposed. These compositions have been found to be remarkably superior in thermal resistance and high temperature strength to epoxy resins and silicone resins which have been used as an insulating heat-resistant material without the use of any solvent.

An object of the present invention is to provide a novel thermosetting resin composition.

Another object of the invention is to improve further the thermal resistance of said thermosetting resin consisting of a polyfunctional isocyanate compound and a polyfunctional epoxy compound.

Other objects will be apparent from the following description.

According to the present invention, a novel thermosetting resin composition consisting essentially of (a) an isocyanate group-terminated condensate obtained by reacting a polycarboxylic acid compound with a stoichiometrical excess of a polyfunctional isocyanate compound or said condensate containing the unreacted isocyanate compound, (b) a polyfunctional epoxy compound and (c) a catalyst which forms mainly isocyanurate rings and oxazolidone rings and a cured product obtained by heating said composition are provided.

The polycarboxylic acid compounds having at least one acid anhydride ring used in the present invention include, for example, trimellitic anhydride, pyromellitic dianhydride, 1,2,3,4-benzenetetracarboxylic acid dianhydride, 3,3′,4,4′-benzophenonetetracarboxylic acid dianhydride, 1,4,5,8-naphthalenetetracarboxylic acid dianhydride, cyclopentanetetracarboxylic acid dianhydride, ethylene glycol bis(trimellitate) dianhydride, glycerol tris(trimellitate) trianhydride, etc.

Among them, pyromellitic dianhydride, 3,3′,4,4′-benzophenonetetracarboxylic acid dianhydride and trimellitic anhydride are suitable in that these anhydrides can give a cured product having a particularly excellent thermal resistance.

As the polyfunctional isocyanate compound, a bifunctional isocyanate compound such as methane diisocyanate, butane-1,1-diisocyanate, ethane-1,2-diisocyanate, butane-1,2-diisocyanate, transvinylene diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, ω, ω′-1,3-dimethylbenzene diisocyanate, ω, ω′-1,4-dimethylbenzene diisocyanate, ω, ω′-1,3-dimethylcyclohexane diisocyanate, ω, ω′-1,4-dimethylcyclohexane diisocyanate, ω, ω′-1,4-dimethylbenzene diisocyanate, ω, ω′-1,4-dimethylnaphthalene diisocyanate, ω, ω′-1,5-dimethylnaphthalene diisocyanate, cyclohexane-1,3-diisocyanate, cyclohexane-1,4-diisocyanate, dicyclohexylmethane-4,4′-diisocyanate, 1,3-phenylenediisocyanate, 1,4-phenylenediisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4′-diisocyanate, diphenylether-2,4′-diisocyanate, naphthalene-1,4-diisocyanate, naphthalene-1,5-diisocyanate, biphenyl-4,4′-diisocyanate, 3,3′-dimethylbiphenyl-4,4′-diisocyanate, 2,3′-dimethoxybiphenyl-4,4′-diisocyanate, diphenylmethane-4,4′-diisocyanate, 3,3′-dimethoxydiphenylmethane-4,4′-diisocyanate, 4,4′-dimethoxydiphenylmethane-3,3′-diisocyanate, diphenylsulfide-4,4′-diisocyanate, diphenylsulfon-4,4′-diisocyanate, etc. and a trior more-functional isocyanate compound such as polymethylenepolyphenylisocyanate, triphenylmethane triisocyanate, tris(4-phenylisocyanatethiophosphate), 3,3′,4,4′-diphenylmethane tetraisocyanate, etc. may be used.

Said polycarboxylic acid compound and said isocyanate compound may respectively be used alone or in admixture of two or more.

These polyfunctional isocyanate compounds are used in stoichiometrical excess with regard to said polycarboxylic acid compounds. In that case, the isocyanate group is condensed with the acid anhydride ring to form an imide ring and forms an amide bond together with the carboxyl group. Thus, a condensate having an imide ring bond in its molecule and having an isocyanate group at the terminal of its molecule is produced. Referring to a diisocyanate and pyromellitic dianhydride, the reaction is considered to proceed according to the following reaction formula,

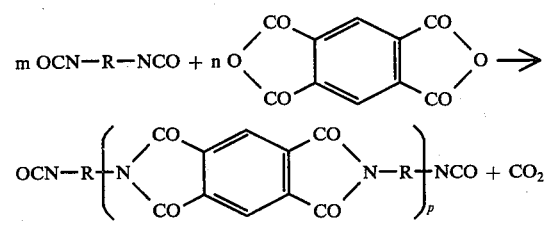

wherein R is a bivalent organic group and $m$, $n$ and $p$ are positive numbers and $m > n$. In such a system, the more an equivalent ratio $m/n$ approaches to 1, the higher the polymerization degree of the condensate is and the more difficult the condensate is to dissolve in the polyfunctional epoxy compound. If the equivalent ratio $m/n$ exceeds 2, part of the polyfunctional isocyanate compound remains unreacted in the condensate. When the amount of the unreacted polyfunctional isocyanate compound increases, the effect of the present invention is reduced. However, the present invention includes such a case where the unreacted isocyanate compound remains in the condensate. The amount of the polyfunctional isocyanate compound used in the present invention vary slightly according to the number of the functional groups in the polycarboxylic acid compound and the polyfunctional isocyanate compound, but an equivalent ratio of the isocyanate group to the acid anhydride ring or anhydride and carboxyl group may be about 1.2 to 10, preferably 2 to 5. Also, within said range, the polyfunctional isocyanate compound may be added to a condensate of the equivalent ratio of less than 2.

The reaction of the polycarboxylic acid compound with the polyfunctional isocyanate compound is effected either in a molten state in the absence of a solvent or in the presence of a solvent. As the solvent used, for example, N,N'-dimethylformamide, N,N-'-dimethylacetamide, hexamethylphosphoramide, N-methyl-2-pyrrolidone, dimethylsulfoxide, etc. are suitable.

Further, in the reaction, a catalyst such as, for example, triethylamine, triethylenediamine, tin octanoate, dibutyltin dilaurate, lead naphthenate, boron trifluoride, etc. may be added in an amount of about 0.05 to 10 percent by weight based on the total weight of the polycarboxylic acid compound and the polyfunctional isocyanate compound in order to promote the reaction. Particularly, an amount of 0.05 to 2 percent by weight is preferable.

The conditions for the reactions are not particularly limited, but the reaction may be effected by heating the reaction mixture at about 100° to 200° C for 4 to 20 hours in a dry inert gas stream.

The polyfunctional epoxy compounds which may be used in the present invention include bifunctional epoxy compounds such as, for example, diglycidyl ether of bisphenol A, butadiene diepoxide, 3,4-epoxycyclohexylmethyl(3,4-epoxy)cyclohexanecarboxylate, vinylcyclohexenedioxide, 4,4'-di(1,2-epoxyethyl)diphenylether, 4,4'-(1,2-epoxyethyl)-biphenyl, 2,2-bis(3,4-epoxycyclohexyl)propane, diglycidyl ether of resorcinol, diglycidyl ether of phloroglucinol, bis(2,3-epoxycyclopentyl)ether, 2-(3,4-epoxy)cyclohexane-5,5-spiro(3,4-epoxy)-cyclohexane-m-dioxane, bis-(3,4-epoxy-6-methylcyclohexyl) adipate, N,N-m-phenylenebis(4,5-epoxy-1,2-cyclohexanedicarboximide), hydantoin ring-containing diepoxy compound, etc. and tri- or more-functional epoxy compounds such as triglycidyl ether of p-aminophenol, polyarylglycidyl ethers, 1,3,5-tri(1,2-epoxy)benzene, 2,2',4,4'-tetraglycidoxybenzophenone, tetraglycidoxytetraphenylethane, polyglycidyl ether of phenol-formaldehyde novolac resin, triglycidyl ether of glycerol, triglycidyl ether of trimethylolpropane, etc.

When a resin composition obtained by adding as essential components an isocyanate group-terminated condensate obtained by reacting the above-mentioned polycarboxylic acid compound with a stoichiometrical excess of a polyfunctional isocyanate compound and a catalyst which forms mainly isocyanurate rings and oxazolidone rings to these polyfunctional epoxy compound is heated, the terminal isocyanate group of said condensate reacts with the epoxy group of said epoxy compounds to form a 2-oxazolidone ring and an isocyanurate ring is formed by the trimerization of the isocyanate group. Thus, crosslinking and curing occur. If said condensate is used in a larger amount, the formation of an isocyanurate ring is enhanced and the thermal resistance of the cured product thus obtained is further improved. If the amount of the condensate used is too large, however, the cured product tends to become brittle. The equivalent ratio of all the isocyanate group to the epoxy group is preferably 0.2 to 4, particularly preferably 0.3 to 1 as a molding cmposition, in the present invention although the preferable equivalent ratio varies according to the number of the functional groups in the isocyanate group-terminated condensate, the polyfunctional isocyanate compound and the polyfunctional epoxy compound, respectively.

The catalysts which form mainly isocyanurate rings and oxazolidone rings used in the present invention include tertiary amines such as, for example, triethylamine, tetramethylbutanediamine, tetramethylpentanediamine, tetramethylhexanediamine, triethylenediamine, dimethylaniline, etc.; oxyalkylamines such as dimethylaminoethanol, dimethylaminopentanol, etc.; N-methylmorpholine, N-ethylmorpholine, tris-(dimethylaminomethyl)phenol, etc. Further, as such a catalyst, imidazoles such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 1-azine-2-methylimidazole, 1-azine-2-ethylimidazole, 1-azine-2-undecylimidazole, etc. may be used. Particularly, tetraphenylborates such as triphenylphosphine tetraphenylborate, triethylamine tetraphenylborate, N-methylmorpholine tetraphenylborate, pyridine tetraphenylborate, 2-ethyl-4-methylimidazole tetraphenylborate, etc. are preferable as the catalyst owing to the storage stability of the raw materials. At least one of these catalysts may be added in an amount of about 0.01 to 10 percent by weight, preferably 1 to 5 percent by weight, based on the weight of the composition consisting of said condensate and the polyfunctional epoxy compound.

Although the curing conditions for the thermosetting resin composition according to the present invention vary according to the composition of the ingredients, the kind of the catalyst used, the amount of the catalyst added, etc., the thermosetting resin composition may be cured by heating it at 150° to 250° C for 1 to 60 minutes. After curing, the composition shows such thermal resistance as it can be used at a temperature higher than 200° C, for example, at 240° C for a long period of time and excellent mechanical and electrical properties. Also, the composition may be applied as a varnish, a casting material or a molding material in the absence of a solvent and if desired, by adding a filler, etc. Further, the composition may be used in the presence of a solvent as a paint or varnish or for the production of laminated materials or reinforced plastics by impregnating various base materials with it. Thus, the composition has various uses.

The following examples, in which all parts are expressed by weight unless otherwise indicated, will serve to illustrate the practice of the invention in more detail.

EXAMPLES 1 – 6

To 100 parts of diphenylmethane-4,4'-diisocyanate (hereinafter referred to as "MDI") were added respectively 11, 22 and 44 parts of pyromellitic dianhydride (hereinafter referred to as "PMDA"). The mixture was heated in a nitrogen gas stream at 180° C for 3 hours to obtain the three condensates as shown in Table 1.

Table 1

| | MDI/PMDA | | Melting point (° C) |
| | Weight ratio | Equivalent ratio | |
| --- | --- | --- | --- |
| I | 100/11 | 8/1 | 30 – 40 |
| II | 100/22 | 4/1 | 80 – 85 |
| III | 100/44 | 2/1 | 155 – 170 |

To Araldite ECN 1273 (a novalac epoxy resin manufactured by Ciba-Geigy Co., epoxy equivalent 225), the condensates I, II and III mentioned in Table 1 were respectively added in the ratios as shown in Table 2. Further, triethylamine tetraphenylborate as a catalyst which forms mainly isocyanurate rings and oxazolidone rings, quartz powder as a filler and stearic acid as a rease agent were respectively added in the ratios as shown in Table 2. The mixtures were kneaded at 80° C for 10 minutes by means of rolls to produce the resin compositions of the present invention.

The compositions thus obtained were compared with regard to flow characteristic by means of SPI-EMMI 1-66, Spiral-flow (180° C, 3 minutes). Also, the compositions were molded under pressure at 170° C and 70 kg/cm$^2$ for 3 minutes, and then postcured at 180° C for 16 hours to obtain cured products. The Barcol hardness (No. 935), heat distortion temperature (JIS K6871) and bending strength at 200° C of the cured products were measured. The measurement results are shown in Table 2.

Table 2

| Composition* | Example 1 | Example 2 | Example 3 | Example 4 | Example 5 | Example 6 |
|---|---|---|---|---|---|---|
| ECN 1273 | 100 | 100 | 100 | 100 | 100 | 100 |
| Condensate I | 100 | 75 | — | — | — | — |
| Condensate II | — | — | 75 | 50 | — | — |
| Condensate III | — | — | — | — | 50 | 25 |
| NCO/epoxy equivalent ratio | 1.4 | 1.1 | 0.9 | 0.6 | 0.36 | 0.18 |
| Triethylamine tetraphenylborate | 3 | 3 | 3 | 3 | 3 | 3 |
| Quartz powder | 140 | 123 | 123 | 105 | 105 | 87.5 |
| Stearic acid | 3 | 3 | 3 | 3 | 3 | 3 |
| Characteristics | | | | | | |
| Flow characteristic of composition, spiral flow (inches) | 40 | 55 | 35 | 36 | 25 | 30 |
| Barcol hardness of cured product | 80 | 70 | 85 | 80 | 90 | 90 |
| Bending strength of cured product (kg/mm$^2$ at 200° C) | 7.0 | 6.5 | 8.5 | 8.0 | 12.0 | 10.0 |
| Bending strength of cured product after heating at 240° C for 30 days (kg/mm$^2$ at 200° C) | 6.5 | 5.5 | 8.3 | 8.0 | 11.5 | 10.0 |
| Heat distortion tempeature of cured product (° C) | >220 | >220 | >220 | >220 | >220 | >220 |

*Composition is represented by parts by weight.

COMPARATIVE EXAMPLE

Since a composition obtained by blending ECN 1273 and MDI only had a low melting point and was easy to gel, a prior art composition was prepared by replacing MDI by naphthalene-1,4-diisocyanate (hereinafter referred to as "NDI"). To 100 parts of ECN 1273 was added 47 parts of NDI. The same catalyst, filler, etc. as those used in Example 3 were further added in the same ratios as in Example 3. The mixture was kneaded at 80° C for 10 minutes to obtain the composition. This composition was cured in the same manner as in Example 3 and the resulting cured product was compared with that of Example 3. The results are shown in Table 3.

Table 3

| | Example 3 | Comparative example |
|---|---|---|
| NCO/epoxy equivalent ratio | 0.90 | 0.88 |
| Flow characteristic of composition, spiral flow (inches) | 35 | 40 |
| Barcol hardness of cured product | 85 | 70 |
| Bending strength of cured product (kg/mm$^2$ at 200° C) | 8.5 | 7.5 |
| Heat distortion temperature of cured product (° C) | >220 | >220 |
| Bending strength of cured product after heating at 240° C for 30 days (kg/mm$^2$ at 200° C) | 8.3 | 7.5 |

Also, prior art compositions comprising MDI and DEN 431 (a novolac epoxy resin manufactured by Dow Chemical Co., epoxy equivalent 175) and having the same NCO/epoxy equivalent ratios as those in Examples 1 and 2, respectively, were produced. The cured products obtained from the composition were compared with the cured products of Examples 1 and 2 with regard to bending strength at 200° C. The results obtained are as follows:

| | Bending strength at 200° C of cured product (kg/mm$^2$) |
|---|---|
| Example 1 | 7.0 |
| Example 2 | 6.5 |
| Prior art compositions | 2.5 |

Examples 7 - 8

To 100 parts of PMDA were added 319 parts of 2,4-tolylene diisocyanate (hereinafter referred to as "TDI") and 848 parts of o-tolidine diisocyanate (hereinafter referred to as "TODI"), respectively. Further, 0.5 percent by weight of tin octanoate was added. The resulting mixtures were reacted in a dry nitrogen gas stream at 180° C for one hour to obtain two condensates. TDI/PMDA equivalent ratio and TODI/PMDA equivalent ratio in these condensates were all 4.0.

To the condensates were added the epoxy compound, etc. as shown in Table 4 to produce compositions. The properties of the compositions and cured products obtained therefrom were measured in the same manner as in Examples 1 – 6. The results obtained are shown in Table 4.

Table 4

|  | Example 7 | Example 8 |
|---|---|---|
| Composition* | | |
| ECN 1273 | 100 | 100 |
| TDI/PMDA | 50 | — |
| TODI/PMDA | — | 50 |
| NCO/epoxy equivalent ratio | 0.6 | 0.6 |
| Triethylamine tetraphenylborate | 3 | 3 |
| Quartz powder | 310 | 310 |
| Stearic acid | 3 | 3 |
| Characteristics | | |
| Flow characteristic of composition, spiral flow (inches) | 25 | 20 |
| Barcol hardness of cured product | 70 | 70 |
| Bending strength of cured product (kg/mm² at 200° C) | 9.0 | 8.5 |
| Heat distortion temperature of cured product (° C) | >220 | >220 |
| Bending strength of cured product after heating at 240° C for 30 days (kg/mm² at 200° C) | 8.8 | 8.5 |

*Composition is represented by parts by weight.

What is claimed is:

1. A thermosetting resin composition consisting essentially of (a) an isocyanate group-terminated condensate obtained by reacting a polycarboxylic acid compound having at least one acid anhydride ring with a stoichiometric excess of a polyfunctional isocyanate compound or said condensate containing the unreacted isocyanate compound, (b) a polyfunctional epoxy compound, the isocyanate group-terminated condensate or said condensate containing the unreacted isocyanate compound being present in an equivalent ratio of isocyanate compound to the polyfunctional epoxy compound of 0.2 : 1 to 4 : 1, and (c) a catalyst which forms mainly isocyanurate rings and oxazolidone rings selected from the group consisting of tertiary amine tetraphenylborates, N-substituted morpholine tetraphenylborates, imidazole tetraphenylborates and onium salt tetraphenylborates, the amount of said catalyst being from about 0.01 to 10% by weight based on the weight of the condensate and the polyfunctional epoxy compound.

2. A thermosetting resin composition according to claim 1, wherein (a) the isocyanate group-terminated condensate or said condensate containing the unreacted isocyanate compound is present in an equivalent ratio of isocyanate compound to (b) the polyfunctional epoxy compound of 0.3 : 1 to 1 : 1.

3. A thermosetting resin composition according to claim 1, wherein (a) the isocyanate group-terminated condensate or said condensate containing the unreacted isocyanate compound is obtained by reacting the polyfunctional isocyanate compound with the polycarboxylic acid compound having at least one acid anhydride ring in an equivalent ratio of isocyanate group to acid anhydride ring or acid anhydride and carboxyl group of 1.2 : 1 to 10 : 1.

4. A cured product produced by heating at a temperature of 150° C or more a thermosetting resin composition consisting essentially of (a) an isocyanate group-terminated condensate obtained by reacting a polycarboxylic acid compound having at least one acid anhydride ring with a stoichiometric excess of a polyfunctional isocyanate compound or said condensate containing the unreacted isocyanate compound, (b) a polyfunctional epoxy compound, the isocyanate group-terminated condensate or said condensate containing the unreacted isocyanate compound being present in an equivalent ratio of isocyanate compound to the polyfunctional epoxy compounds of 0.1 : 1 to 4 : 1, and (c) a catalyst which forms mainly isocyanurate rings and oxazolidone rings selected from the group consisting of tertiary amine tetraphenylborates, N-substituted morpholine tetraphenylborates, imidazole tetraphenylborates and onium salt tetraphenylborates and the amount of said catalyst being from about 0.01 to 10% by weight based on the weight of the condensate and the polyfunctional epoxy compound.

5. A cured product according to claim 4, wherein (a) the isocyanate group-terminated condensate or said condensate containing the unreacted isocyanate compound is present in an equivalent ratio of isocyanate compound to (b) the polyfunctional epoxy compound of 0.3 : 1 to 1 : 1.

6. A cured product according to claim 4, wherein (a) the isocyanate group-terminated condensate or said condensate containing the unreacted isocyanate compound is obtained by reacting the polyfunctional isocyanate compound with the polycarboxylic acid compound having at least one acid anhydride ring in an equivalent ratio of isocyanate group to acid anhydride ring or acid anhydride and carboxyl group of 1.2 : 1 to 10 : 1.

7. A thermosetting resin composition according to claim 1, wherein (a) the isocyanate group-terminated condensate or said condensate containing the unreacted isocyanate compound is obtained by reacting the polyfunctional isocyanate compound with the polycarboxylic acid compound having at least one acid anhydride ring in an equivalent ratio of isocyanate group to acid anhydride ring or acid anhydride and a carboxyl of 2 : 1 to 5 : 1.

8. A cured product according to claim 4, wherein (a) the isocyanate group-terminated condensate or said condensate containing the unreacted isocyanate compound is obtained by reacting the polyfunctional isocyanate compound with the polycarboxylic acid compound having at least one acid anhydride ring in an equivalent ratio of isocyanate group to acid anhydride ring or acid anhydride and carboxyl group of 2 : 1 to 5 : 1.

* * * * *